United States Patent
Stowell et al.

(10) Patent No.: US 7,368,164 B2
(45) Date of Patent: May 6, 2008

(54) SMOOTH OUTER COATING FOR COMBUSTOR COMPONENTS AND COATING METHOD THEREFOR

(75) Inventors: William Randolph Stowell, Rising Sun, OH (US); Daniel Peter Ivkovich, Fairfield, OH (US); Timothy Lance Manning, Cincinnati, OH (US); Tara Easter McGovern, Simpsonville, SC (US); Jane Ann Murphy, Franklin, OH (US); Thomas Walter Rentz, Cincinnati, OH (US); Mathew Curtis Roling, Simpsonville, SC (US); Raymond Grant Rowe, Niskayuna, NY (US); Andrew Jay Skoog, West Chester, OH (US)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 10/710,110

(22) Filed: Jun. 18, 2004

(65) Prior Publication Data
US 2005/0282020 A1 Dec. 22, 2005

(51) Int. Cl.
*B32B 18/00* (2006.01)
*B32B 9/00* (2006.01)
*F04D 29/38* (2006.01)

(52) U.S. Cl. ............ 428/325; 428/328; 428/450; 428/469; 428/701; 428/702; 416/241 B

(58) Field of Classification Search .......... None
See application file for complete search history.

(56) References Cited

U.S. PATENT DOCUMENTS

| 5,123,248 | A | * | 6/1992 | Monty et al. ........... 60/740 |
| 5,211,536 | A | * | 5/1993 | Ackerman et al. ....... 415/177 |
| 6,294,261 | B1 | | 9/2001 | Sangeeta et al. |
| 6,428,630 | B1 | | 8/2002 | Mor et al. |
| 6,465,090 | B1 | | 10/2002 | Stowell et al. |
| 2002/0102360 | A1 | * | 8/2002 | Subramanian et al. ... 427/419.1 |

FOREIGN PATENT DOCUMENTS

| EP | 1484427 | 12/2004 |
| EP | 1505176 | 2/2005 |

* cited by examiner

*Primary Examiner*—Jennifer McNeil
*Assistant Examiner*—Timothy M. Speer
(74) *Attorney, Agent, or Firm*—William Scott Andes; Gary M. Hartman; Domenica N. S. Hartman

(57) ABSTRACT

A coating and method for overcoating a TBC on a component used in a high-temperature environment, such as the combustor section of an industrial gas turbine. The coating defines the outermost surface of the component and is formed of at least two layers having different compositions. An inner layer of the coating contains alumina in a first silica-containing matrix material that is free of zinc titanate. An outer layer of the coating contains alumina, a glass material, and zinc titanate in a second silica-containing matrix material. The outer layer of the coating has a surface roughness of not greater than three micrometers Ra and forms the outermost surface of the component. The coating reduces the component temperature by reducing the convective and radiant heat transfer thereto.

12 Claims, 2 Drawing Sheets

SMOOTH OUTER COATING FOR COMBUSTOR COMPONENTS AND COATING METHOD THEREFOR

BACKGROUND OF INVENTION

1. Field of the Invention

The present invention generally relates to coatings for components exposed to high temperatures, such as the hostile thermal environment of a gas turbine. More particularly, this invention relates to a smooth outer coating for combustor components of a gas turbine component, in which the coating reduces the component temperature by reducing the convective and radiant heat transfer to the component in the combustor section of the turbine.

2. Description of the Related Art

Hot section components of aircraft and industrial (power generation) gas turbine engines are often protected by a thermal barrier coating (TBC), which reduces the temperature of the underlying component substrate and thereby prolongs the service life of the component. Ceramic materials and particularly yttria-stabilized zirconia (YSZ) are widely used as TBC materials because of their high temperature capability, low thermal conductivity, and relative ease of deposition by plasma spraying, flame spraying and physical vapor deposition (PVD) techniques. Air plasma spraying (APS) is often preferred over other deposition processes due to relatively low equipment costs and ease of application and masking. TBC's deposited by APS are characterized by a degree of inhomogeneity and porosity that occurs as a result of the deposition process, in which "splats" of molten material are deposited and subsequently solidify. The resulting surface of the TBC is relatively rough, with a surface roughness of 250 to 350 microinches Ra (about 6 to 9 micrometers Ra) being typical for YSZ deposited by APS (APSTBC). The inhomogeneity and porosity of a plasma-sprayed TBC enhances the thermal insulating property of the TBC, and thus helps to reduce the temperature of the component on which the TBC is deposited. In regard to infrared (IR) transmissivity, analysis has shown that APSTBC is about 20% to 70% transparent to thermal radiation (wavelengths of about 780 nm to about 1 mm) when deposited at typically thicknesses of about 250 to 500 micrometers. As a result, the thermal protection provided by APSTBC is compromised in environments that have high thermal radiation loads, such as within the combustor section of a gas turbine.

To be effective, TBC systems must strongly adhere to the component and remain adherent throughout many heating and cooling cycles. The latter requirement is particularly demanding due to the different coefficients of thermal expansion (CTE) between ceramic materials and the substrates they protect, which are typically superalloys though ceramic matrix composite (CMC) materials are also used. To promote adhesion and extend the service life of a TBC system, an oxidation-resistant bond coat is often employed. Bond coats are typically in the form of an overlay coating such as MCrAlX (where M is iron, cobalt and/or nickel, and X is yttrium or another rare earth element), or a diffusion aluminide coating. During the deposition of the ceramic TBC and subsequent exposures to high temperatures, such as during turbine operation, these bond coats form a tightly adherent alumina ($Al_2O_3$) layer or scale that adheres the TBC to the bond coat.

The service life of a TBC system is typically limited by a spallation event brought on by thermal fatigue. In addition to the CTE mismatch between a ceramic TBC and a metallic substrate, spallation can be promoted as a result of the TBC being subjected to substances within the hot gas path of a gas turbine. For example, spallation of TBC from combustor components such as liners, heatshields and transition pieces can be accelerated in industrial gas turbines that burn liquid fuel or utilize water injection for NOx abatement.

In view of the above, further improvements would be desirable for the ability of TBC on combustor components to reject heat and resist spallation.

SUMMARY OF INVENTION

The present invention generally provides a coating and method for overcoating a TBC on a component used in a high-temperature environment, such as the combustor section of a gas turbine. The invention is particularly directed to a coating that reduces the component temperature by reducing the convective and radiant heat transfer to the component in the combustor section of an industrial gas turbine.

The coating of this invention defines the outermost surface of the component it protects, and is formed of at least two layers having different compositions. An inner layer of the coating contains first and second alumina particles in a first silica-containing matrix material that is free of zinc titanate and consists essentially of silica, silicate and/or mullite. The first alumina particles have a particle size that is coarser than the second alumina particles. An outer layer of the coating contains third alumina particles having a particle size distribution finer than the first and second alumina particles, a glass material, and zinc titanate in a second silica-containing matrix material consisting essentially of silica, silicate and/or mullite. The outer layer of the coating has a surface roughness of not greater than 120 microinches Ra (about 3 micrometers Ra) and, as the outermost surface of the component, is subjected to the hot combustion gases within the combustor section.

The method of this invention involves preparing first and second slurries from which the inner and outer layers of the coating are formed. As such, the first slurry is free of zinc titanate and contains the first and second alumina particles in a first silica-forming binder material, while the second slurry contains the third alumina particles, glass material, and zinc titanate in a second silica-forming binder material. Following deposition of the thermal barrier coating on the component, the first slurry is deposited on the thermal barrier coating after which the second slurry is deposited on the inner layer. The slurry layers formed by the first and second slurries are fired to form the inner and outer layers, respectively, of the coating, with the outer layer defining the outermost surface of the component.

As noted above, the coating of this invention reduces the component temperature by reducing the convective and radiant heat transfer to the component. In particular, the fine particle size distribution of the outer layer enables the outermost surface defined by the outer layer to be sufficiently smooth to significantly reduce convective heat transfer to the component, and the zinc titanate contained in the outer layer serves to reduce the IR transmissivity of the coating. The bimodal particle size distribution of the inner layer promotes the chemical inertness and stability of the inner layer. Furthermore, the inner layer is chemically compatible with the outer layer and the absence of zinc titanate in the inner layer promotes the adhesion of the outer layer to the component.

In addition to the above benefits, the coating of this invention improves the spallation and erosion resistance of the TBC, and is therefore capable of significantly extending the life of the gas turbine component protected by the thermal barrier coating.

Other objects and advantages of this invention will be better appreciated from the following detailed description.

DETAILED DESCRIPTION

Figure 1:
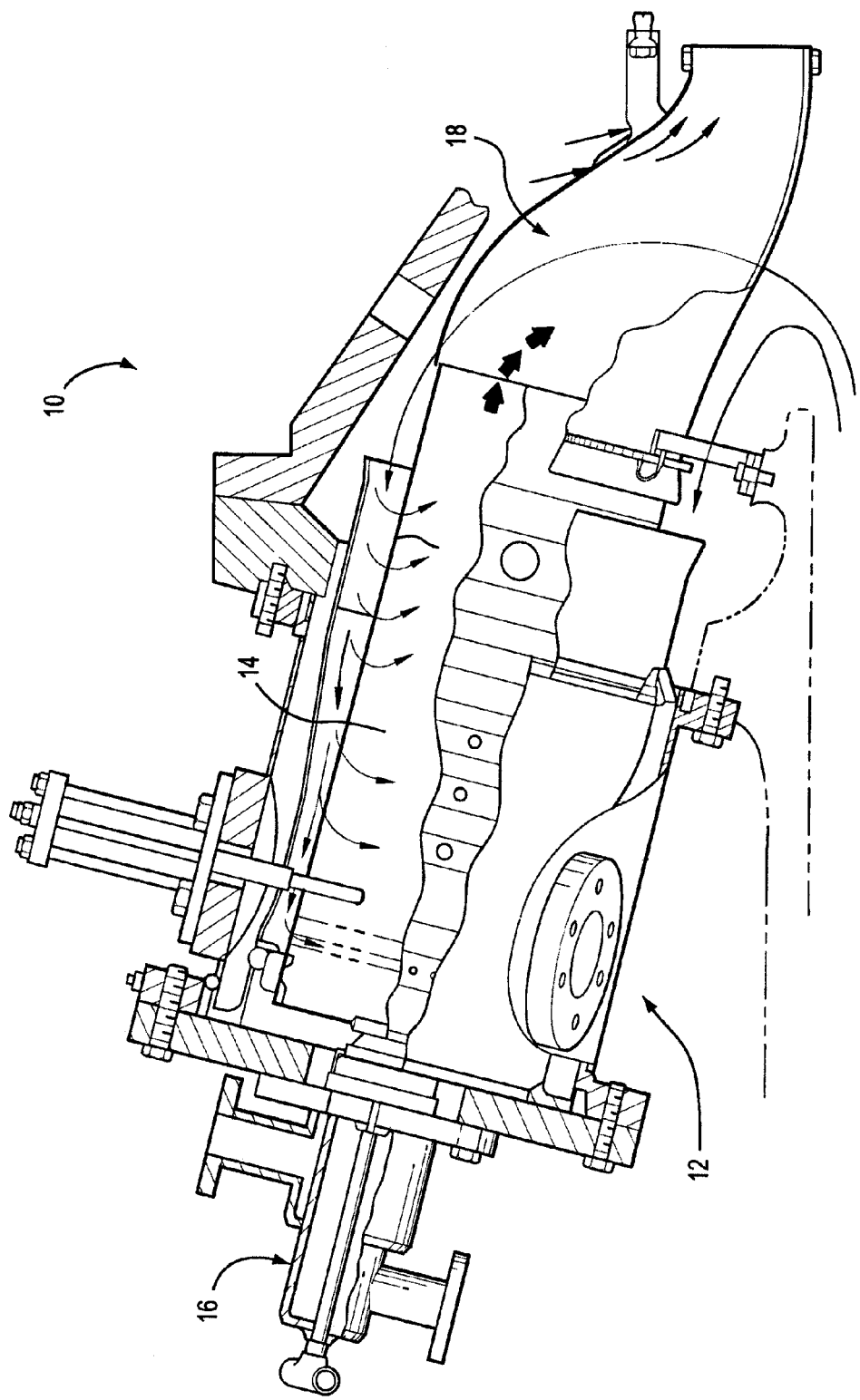
FIG. 1 is a partial cross-sectional view through a single annular combustor structure.

The present invention will be described in reference to a combustor 12 of an industrial gas turbine 10, a portion of which is shown in cross-section in FIG. 1. The combustor 12 is one of multiple can-annular combustors located about the periphery of the turbine 10, and has a can-type liner 14 whose interior defines a combustion chamber of the turbine 10. The liner 14 is inserted into a transition piece 18 with multiple fuel nozzle assemblies 16 located at the head end of the liner 14. Both fuel and water may be injected into the combustion chamber through the nozzle assemblies 16, with the injection of water being for the purpose of reducing combustion temperatures and consequently NOx emissions. The invention is not limited to combustors having the configuration shown in FIG. 1, but instead is applicable to other combustor configurations, such as the well-known annular type.

Figure 2:
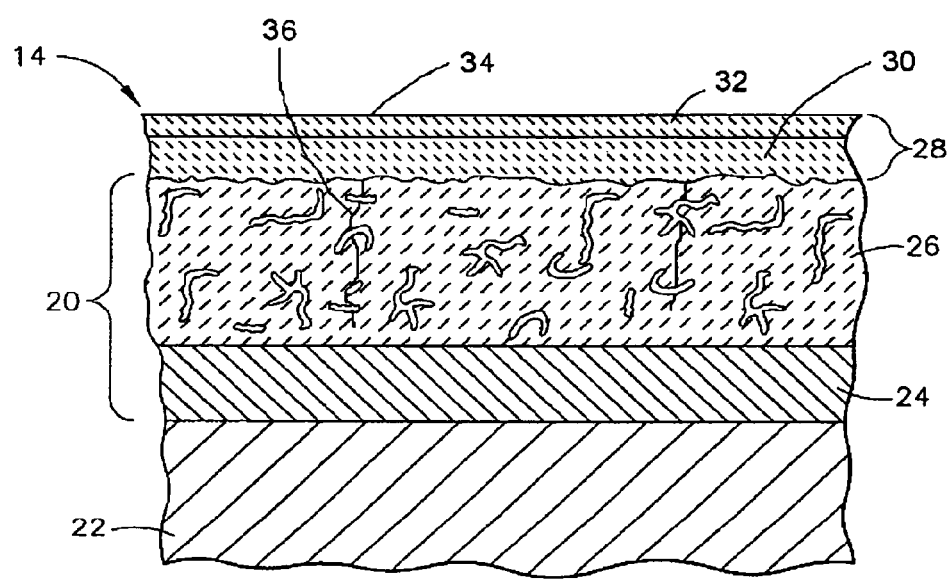
FIG. 2 is a cross-sectional view of the combustor structure of FIG. 1, and shows a multilayer outer coating overlaying a thermal barrier coating in accordance with this invention.

A thermal barrier coating (TBC) system 20 of a type suitable for thermally insulating the interior surfaces of the liner 14 is represented in cross-section in FIG. 2. As shown, the TBC system 20 includes a bond coat 24 overlying a substrate 22, which is typically but not necessarily the base material of the liner 14. Suitable materials for the substrate 22 (and therefore the liner 14) include nickel, iron and cobalt-base superalloys, as well as nonmetallic structural materials including ceramic matrix composite (CMC) materials. The TBC system 20 further includes a thermal barrier coating, hereinafter TBC 26, that provides the thermal protection for the substrate 22. A preferred material for the TBC 26 is an yttria-stabilized zirconia (YSZ), a preferred composition being about 3 to about 8 weight percent yttria, though other ceramic materials could be used, such as alumina, nonstabilized zirconia, or zirconia partially or fully stabilized by magnesia, ceria, scandia or other oxides. The bond coat 24 may be an overlay coating such as MCrAlX (where M is iron, cobalt and/or nickel, and X is yttrium or another rare earth element), or a diffusion aluminide coating such as a platinum aluminide.

The TBC 26 is depicted as having been deposited by air plasma spraying (APS), by which "splats" of molten material are deposited on the bond coat 24. As indicated, the TBC 26 has a degree of inhomogeneity and porosity that typically occurs in coatings produced by plasma spraying. In addition, the surface of the TBC 26 is relatively rough, with a surface roughness of about 200 to 500 microinches Ra (about 5 to 13 micrometers Ra) being typical for YSZ deposited by APS (APSTBC). While depositing the TBC 26 by APS is of particular interest to this invention, other plasma spraying techniques could also be used, such as low pressure plasma spraying (LPPS; also known as vacuum plasma spraying (VPS)). The TBC 26 is deposited to a thickness that is sufficient to provide the required thermal protection for the underlying substrate 22 and liner 14.

The bond coat 24 is preferably an NiCrAlY overlay coating and the TBC 26 is zirconia stabilized by about eight weight percent yttria (8% YSZ). The bond coat 24 is preferably deposited by APS to a thickness of about 0.007 to about 0.010 inch (about 175 to about 250 micrometers) and has an average surface roughness $R_a$ of at least about 320 microinches (about 8 microinches) to promote adhesion of the TBC 26. Though not required by the invention, the TBC 26 is depicted as having a construction disclosed in commonly-assigned U.S. Pat. No. 6,047,539 to Farmer, whereby the TBC 26 has vertical mirocracks 36 that extend through at least one-half the thickness of the TBC 26, and the density of the TBC 26 is preferably at least 90% of theoretical, i.e., contains less than 10% porosity by volume and more preferably less than 8% porosity by volume. A suitable thickness for the TBC is about 760 to about 2500 micrometers.

While many TBC systems use YSZ deposited by APS as the outermost layer, drawbacks include the roughness of the TBC surface, erosion resistance, and transmissivity to infrared (IR) radiation. Within the operating environment of a gas turbine, surface roughness increases turbulent heat transfer from the hot combustion gases to the component and reduces aerodynamic performance. While surface roughness can be reduced by polishing, such as tumbling or hand polishing, the final surface finish and thickness of the TBC cannot be closely controlled and the additional processing costs are undesirable. Though crystalline YSZ is very resistant to erosion, the erosion resistance of a YSZ APSTBC is significantly reduced as a result of its porosity and microcrack structure, the result of which is that fine particle bombardment dislodges small pieces of the TBC. In regard to IR transmissivity, analysis has shown that YSZ is about 20% to 70% transparent to thermal radiation (wavelengths of about 780 nm to about 1 mm) when deposited by APS to thicknesses of about 250 to 500 micrometers. As a result, the thermal protection provided by YSZ APSTBC is compromised in environments that have high thermal radiation loads, such as within the combustor 10 of FIG. 1. Finally, another consideration is the susceptibility of YSZ TBC's to attack by CMAS, which is a relatively low melting eutectic that when molten is able to infiltrate conventional TBC and promote spallation during thermal cycling.

To address the above concerns, the TBC 26 in FIG. 2 is overcoated by a multilayer outer coating 28. As the outermost coating on the liner 14, the coating 28 defines the outermost surface 34 of the liner 14 and therefore also determines the surface roughness of the liner 14. The outer coating 28 of this invention is also tailored to serve as a barrier to thermal radiation, while also having the advantage of being more resistant to erosion and CMAS infiltration than the TBC 26. The outer coating 28 achieves these features of the invention as a result of its composition and methods of deposition as described below.

The outer coating 28 is generally an alumina-base silica-bound ceramic material. More particularly, the outer coating 28 contains alumina ($Al_2O_3$) dispersed within a binder matrix material composed of silica ($SiO_2$), silicates and/or mullite ($3Al_2O_3 \cdot 2SiO_2$), the relative amounts of which will vary depending on the firing temperature and subsequent service temperatures seen by the coating 28, with greater amounts of mullite forming at higher temperatures. The coating 28 is depicted as comprising an inner layer 30 contacting the TBC 26 and an outer layer 32 defining the outermost surface 34, with the combined thicknesses of the layers 30 and 32 being less than that of the TBC 26. The compositions of the layers 30 and 32 are tailored for their particular function. The inner layer 30 is preferably limited to containing alumina in a silica matrix material, while the outer layer 32 includes alumina as well as a glass and zinc titanate ($Zn_2TiO_4$) in a silica matrix material. While alumina is the preferred constituent of the coating 28, up to about 65 percent by weight of the alumina could be replaced by other metal oxides, such as zirconia ($ZrO_2$), magnesia (MgO), titania ($TiO_2$), or mullite.

A more particular composition for the inner layer 30 contains about 5 to about 85 weight percent alumina, more preferably 40 to about 60 weight percent alumina, with the balance being essentially the silica matrix material. The inner layer 30 is deposited on the TBC 26 in the form of a slurry that is subsequently dried and fired. The slurry is preferably formulated to contain alumina particles in two discrete particle size ranges. In such a bimodal size distribution, a suitable particle size range for the coarser constituent is about 3.0 to about 6.0 micrometers in diameter. A preferred alumina powder for the coarser constituent has a particle size range of about 3.0 to about 5.5 micrometers in diameter, and is commercially available under the designation A-14 from ALCOA. A suitable particle size range for the finer alumina particles is about 0.05 to about 0.8 micrometers in diameter. A preferred alumina powder for the finer constituent has a particle size range of about 0.10 to about 0.6 micrometers in diameter, and is commercially available under the designation Baikalox SM8 from Baikowski International Corporation. The SM8 material has an agglomerate size distribution (on a cumulative weight basis) of 65% below 0.3 micrometer, 78% below 0.4 micrometer, 95% below 0.6 micrometer, and 100% below 1.0 micrometer.

In the preferred size ranges, the finer particles are able to fill the spaces between the larger particles at the surface of the inner layer 30 to reduce its surface roughness. Another benefit of the bimodal size distribution of the alumina particles is that at very high temperatures, silica within the matrix material of the inner layer 30 preferentially reacts with the finer alumina particles to form a mullite phase.

The slurry is prepared by combining the alumina powders with a silica precursor and a sufficient amount of carrier liquid to enable the slurry to be applied by spraying. A suitable precursor for the slurry is a silicone such as polymethyl siloxane, a particular example of which is a resin manufactured by GE Silicones under the name SR350, and classified as a methylsesquisiloxane mixture of the polysiloxane family. A suitable carrier liquid is an anhydrous alcohol such as methanol or ethanol, though acetone, isopropyl alcohol or trichloroethylene could be used. A suitable slurry contains about 40 to about 65 weight percent of the alumina powder (preferably having the two particle size ranges discussed above), about 1 to about 45 weight percent of the silica precursor, and about 5 to about 90 weight percent of the carrier liquid. The coarser and finer alumina particles preferably constitute, by weight, about 20% to about 55% and about 20% to about 40%, respectively, of the slurry. After being sprayed on the TBC 26 using any suitable sprayer known in the art, the composition can be dried at room temperature and then fired to burn off the carrier liquid and yield a substantially homogeneous inner layer 30. A suitable thickness for inner layer 30 is in a range of about 0.0003 to about 0.007 inch (about 7.5 to about 180 micrometers).

To achieve the desired surface roughness of not more than 120 microinches Ra (about 3 micrometers Ra) for the outermost surface 34, the outer layer 32 must have a smoother surface finish than the underlying TBC 26. As noted above, the outer layer 32 of the coating 28 preferably contains, in addition to alumina and silica, a glass material and zinc titanate, the latter of which promotes the reflectivity of the outer layer 32 by promoting the Mie-like scattering effect of the coating 28. To achieve this capability, the zinc titanate content is dispersed in the outer layer 32 of the coating 28. A particular composition for the outer layer 32 contains, by weight, about 5 to about 85% alumina, about 0 to about 35% zinc titanate, about 0 to about 35% of the glass material, and the balance the silica-containing matrix material. A more preferred composition for the outer layer 32, by weight, is about 25 to about 65% alumina, about 10 to about 25% zinc titanate, about 10 to about 25% glass material, and the balance the silica matrix material.

As with the inner layer 30, the outer layer 32 is deposited in the form of a slurry that is subsequently dried and fired. Contrary to the slurry for the inner layer 30, the slurry for the outer layer 32 preferably contains alumina particles in a single particle size range whose particle size distribution is finer than each of the particle size distributions of the alumina particles used to form the inner layer 30. The alumina particles constitute about 5 to about 80 weight percent of the slurry, more preferably about 25 to about 65 weight percent of the slurry for the outer layer 32. A suitable alumina powder for the outer layer 32 is commercially available under the designation A-16SG from ALCOA, and has an average particle size of about 0.48 micrometers.

A glass frit, zinc titanate, a silica precursor, and a liquid carrier preferably make up the balance of the slurry. Glass frit particles constitute about 0 to about 35 weight percent of the slurry, more preferably about 10 to about 25 weight percent of the slurry for the outer layer 32. A preferred glass frit material is a proprietary composition commercially available from Vitripak, Inc. under the name V212, with a particle size of −325 mesh (less than 45 micrometers in diameter). While other glass frit materials could foreseeably be used, such as V55B and V213 glass frit available from Vitripak and 7052 glass frit available from Corning, the V212 material has been shown to be suitable for having a melting temperature and coefficient of thermal expansion that are compatible with the super-alloy substrate 22 and the operating environment within a gas turbine. Zinc titanate particles constitute about 0 to about 35 weight percent of the slurry, more preferably about 10 to about 25 weight percent of the slurry for the outer layer 32, with a suitable particle size being −325 mesh (less than 45 micrometers in diameter).

The above solid components are combined with an appropriate amount of silica precursor and a sufficient amount of carrier liquid to yield a slurry. Similar to the inner layer 30, a suitable precursor for the silica-containing matrix material of the outer layer 32 is a silicone such as polymethyl siloxane, a particular example of which is a resin manufactured by GE Silicones under the name SR355. This silicone is also classified as a methylsesquisiloxane mixture of the polysiloxane family, but yields less silica when fired than the SR350 silicone used to form the inner layer 30. A higher silica content is preferred for the inner layer 30 to promote the yield strength of the inner layer 30, thereby increasing the compliance of the inner layer 30 to promote strain isolation resulting from CTE mismatch between the TBC 26 and the outer layer 32. Finally, the same liquid carrier used to form the slurry for the inner layer 30 can be used to form the slurry for the outer layer 32. A suitable slurry contains about 1 to about 45 weight percent of the silica precursor, and about 5 to about 95 weight percent of the carrier liquid.

After being sprayed on the inner layer 30, the slurry can be dried at room temperature and then fired to burn off the carrier liquid and yield a substantially homogeneous outer layer 32. The surface roughness of the outer layer 32 is in the range of about 20 to about 120 microinches Ra (about 0.5 to 3 micrometers Ra), preferably not more than 40 microinches Ra (about 1 micrometer Ra), which is significantly smoother than that possible for the TBC 26 when deposited by APS. A suitable thickness for outer layer 32 is about 0.0005 to about 0.005 inch (about 10 to about 130 micrometers).

As a result of their different compositions, the inner and outer layers 30 and 32 define distinct inner and outer zones of the coating 28, respectively, as represented in FIG. 2. The thickness, structure and properties of the outer coating 28 can be tailored by the firing temperatures and durations used for each layer 30 and 32. A suitable firing technique is to heat the sprayed composition at a rate of about 10° F. per minute (about 5.5° C./minute) to a maximum hold temperature of about 800° F. to about 2500° F. (about 425° C. to about 1370° C.). The hold temperature is held for a duration of at least one hour to convert the precursor to the desired silica-containing matrix material and at least partially sinter the resulting ceramic constituents of the layers 30 and 32. The degree to which the layers 30 and 32 are sintered can be tailored for the service temperature of the component. In a preferred embodiment, the layers 30 and 32 are not sintered to full density, so that voids (not shown) are present in the coating 28. The voids serve to reduce the thermal conductivity of the coating 28 as well as provide stress relief.

An important feature of the outer coating 28 of this invention is that it reduces the temperature of the component it protects by reducing the convective and radiant heat transfer to the component. In particular, the outermost surface 34 defined by the outer layer 32 of the coating 28 is sufficiently smooth to significantly reduce convective heat transfer to the component, and the zinc titanate contained in the outer layer 32 serves to reduce the IR transmissivity of the coating 28. The inner layer 30 is formulated to be compliant (for strain isolation) and chemically compatible with the outer layer 32, and the absence of zinc titanate in the inner layer 30 has been shown to promote the adhesion of the outer layer 32 to the TBC 26. Voids within the at least the outer layer 32 also potentially serve as radiation-scattering centers to significantly reduce heating of the liner 14 by thermal radiation. The voids are capable of providing this advantage by having an index of refraction different from that of the alumina particles, glass frit, zinc titanate, and silica-containing matrix material. Portions of the radiation propagated through the coating 28 are forward-scattered and back-scattered by the voids, similar to Mie-scattering that occurs when solar radiation is scattered in all directions by water droplets in the atmosphere. A suitable level of porosity for the outer coating 28 appears to be on the order of about 10% porosity, though lesser and greater levels of porosity are foreseeable. The voids form as a result of spaces between the alumina particles as well as from the decomposition of the organic portions of the matrix material precursor and the carrier of the as-deposited slurry coating.

In an investigation leading to the invention, testing was performed with one-inch diameter (about 25 mm) superalloy buttons on which a bond coat of NiCrAlY was deposited by APS to a thickness of about 0.006 inch (about 150 micrometers), over which a TBC of YSZ was deposited by APS to have a thickness of about 0.005 to about 0.008 inch (about 125 to about 200 micrometers). Some of the buttons were additionally coated with a two-layer outer coating in accordance with the invention. The outer coatings were formed by preparing separate slurries for the inner and outer layers of the outer coatings, as discussed above. The slurry composition for the inner layers contained about 316 grams SR350 silicone, about 376 gams of the fine SM8 alumina powder, about 516 gams of the coarser A-14 alumina powder, and about 500 gams of reagent alcohol as the liquid carrier. The slurry composition used to form the outer layers of the coatings contained about 150 grams SR355 silicone, about 500 gams of the A-16SG alumina powder, about 250 gams of zinc titanate, about 250 grams of the V212 glass, and about 500 gams of reagent alcohol as the liquid carrier. When preparing the slurries, their respective silicone constituents were first dissolved in the liquid carrier, after which the powder materials were added and then the mixtures ball milled for about twelve hours.

The slurry compositions were individually applied to the buttons and then sintered at a temperature of about 1650° F. (about 900° C.) for a duration of about one hour to convert the SR350 and SR355 precursors to the desired silica-containing matrix materials. The inner layer of the outer coating on each button had a final thickness of about 0.003 to about 0.008 mils (about 75 to about 200 micrometers) and a final composition of about 79 weight percent alumina with the balance essentially the silica matrix material. The outer layers were approximately about 0.0005 to about 0.005 mils (about 10 to about 125 micrometers) thick and contained, in weight percent, about 48% alumina, about 24% glass, about 24% zinc titanate, with the balance essentially the silica matrix material.

The buttons were then subjected to a test in which a flame was directed at their coated surfaces, followed by cooling air. The backsides of the buttons were continuously subjected to cooling air. During the test, in which a temperature of about 2550° F. (about 1400° C.) was attained at the coating surfaces, the buttons protected with the outer coating of this invention exhibited backside temperatures of about 1730° F. (about 943° C.) compared to about 1830° F. (about 998° C.) for the buttons coated only with TBC, for a difference of about 100° F. (about 55° C.).

While the invention has been described in terms of a preferred embodiment, it is apparent that other forms could be adopted by one skilled in the art, such as by substituting other TBC, bond coat and substrate materials. Accordingly, the scope of the invention is to be limited only by the following claims.

The invention claimed is:

1. A combustor component of a gas turbine, the component having a thermal barrier coating overlying a surface thereof and a multilayer outer coating overlying the thermal barrier coating, the outer coating comprising an inner layer and an outer layer, the inner layer consisting essentially of about 5 to about 85 weight percent of alumina comprising first and second alumina particles and the balance being a first silica-containing matrix material, the silica-containing matrix material being free of zinc titanate and consisting essentially of at least one of silica, silicate and mullite, the first and second alumina particles defining a bimodal size distribution in which the first alumina particles have a particle size range of about 3.0 to about 6.0 micrometers and the second alumina particles have a particle size range of about 0.05 to about 0.8 micrometer, the outer layer consisting essentially of about 5 to about 85 weight percent of third alumina particles, about 0 to about 35 weight percent of a glass material, about 0 to about 35 weight percent zinc titanate, and the balance being a second silica-containing matrix material consisting essentially of at least one of silica, silicate and mullite, the third alumina particles of the outer layer having a particle size distribution that is finer than the particle size distribution of the first alumina particles and finer than the particle size distribution of the second alumina particles of the inner layer, the outer layer defining an outermost surface of the component, the outermost surface having a surface roughness of not greater than 3 micrometers Ra.

2. A component according to claim 1, wherein the outer coating has a thickness of less than the thermal barrier coating and the outermost surface has a surface roughness of not greater than 1 micrometer Ra.

3. A component according to claim 1, the inner layer contains about 40 to about 65 weight percent alumina.

4. A component according to claim 1, wherein the outer layer contains about 25 to about 65 weight percent alumina, about 10 to about 25 weight percent of the glass material, and about 10 to about 25 weight percent zinc titanate.

5. A component according to claim 1, the inner layer consists of the alumina and the first silica-containing matrix material, and the outer layer consists of the alumina, the glass material, the zinc titanate, and the second silica-containing matrix material.

6. A component according to claim 1, further comprising a bond coat on the surface of the component and bonding the thermal barrier coating to the component.

7. A component according to claim 6, wherein the bond coat has a chemical composition consisting essentially of nickel, chromium, aluminum, yttrium and incidental impurities, and the bond coat has an average surface roughness $R_a$ of at least about 8 micrometers.

8. A component according to claim 1, wherein the thermal barrier coating has been deposited by air plasma spraying.

9. A component according to claim 8, wherein the thermal barrier coating has a chemical composition consisting essentially of zirconia, yttria and incidental impurities.

10. A component according to claim 1, wherein the third alumina particles are in a single particle size range.

11. A component according to claim 1, wherein the combustor component comprises a liner whose interior defines a combustion chamber of the gas turbine, and the surface overlaid by the thermal barrier coating is a surface of the liner.

12. A combustor liner of a gas turbine, the liner having an interior defining a combustion chamber of the gas turbine, the liner comprising:

a thermal barrier coating overlying a surface of the liner; and a multilayer outer coating overlying the thermal barrier coating, the outer coating comprising an inner layer and an outer layer, the inner layer consisting essentially of about 5 to about 85 weight percent of alumina comprising first and second alumina particles and the balance being a first silica-containing matrix material, the silica-containing matrix material being free of zinc titanate and consisting essentially of at least one of silica, silicate and mullite, the first and second alumina particles defining a bimodal size distribution in which the first alumina particles are coarser than the second alumina particles, the outer layer consisting essentially of about 5 to about 85 weight percent of third alumina particles, about 0 to about 35 weight percent of a glass material, about 0 to about 35 weight percent zinc titanate, and the balance being a second silica-containing matrix material consisting essentially of at least one of silica, silicate and mullite, the third alumina particles of the outer layer having a particle size distribution that is finer than the particle size distribution of the first alumina particles and finer than the particle size distribution of the second alumina particles of the inner layer, the outer layer defining an outermost surface of the liner, the outermost surface having a surface roughness of not greater than 3 micrometers Ra;

wherein the outermost surface defined by the outer layer is subjected to hot combustion gases within the combustor chamber.

* * * * *

UNITED STATES PATENT AND TRADEMARK OFFICE
CERTIFICATE OF CORRECTION

| | | |
|---|---|---|
| PATENT NO. | : 7,368,164 B2 | Page 1 of 1 |
| APPLICATION NO. | : 10/710110 | |
| DATED | : May 6, 2008 | |
| INVENTOR(S) | : William Randolph Stowell et al. | |

It is certified that error appears in the above-identified patent and that said Letters Patent is hereby corrected as shown below:

On the Title page Item (75), after "Rising Sun", delete "OH" and insert therefor --IN--.

Signed and Sealed this

Twelfth Day of August, 2008

JON W. DUDAS
*Director of the United States Patent and Trademark Office*